United States Patent Office

Re. 27,333
Reissued Apr. 11, 1972

27,333

PROCESS FOR AFTERTREATMENT OF FRESHLY COLORED POLYAMIDE FIBERS

Karl Soiron, Riehen, Switzerland, Hans Rafael, Weil am Rhein, Germany, and Walter Stockar, Binningen, Switzerland, assignors to Ciba-Geigy AG, Basel, Switzerland No Drawing. Original No. 3,490,860, dated Jan. 20, 1970, Ser. No. 665,223, Sept. 5, 1967, which is a division of Ser. No. 296,392, July 19, 1963. Application for reissue Sept. 1, 1970, Ser. No. 68,807

Claims priority, application Switzerland, July 31, 1962, 9,156/62

Int. Cl. D06p *5/02*

U.S. Cl. 8—165 10 Claims

Matter enclosed in heavy brackets [ ] appears in the original patent but forms no part of this reissue specification; matter printed in italics indicates the additions made by reissue.

ABSTRACT OF THE DISCLOSURE

An improvement in the dyeing and printing of polyamide fibers, comprising an an after-treatment the introduction of such fibers which have been freshly dyed or printed with a fiber reactive dyestuff, prior to the conventional drying, into an aqueous bath which contains certain halogenated organic products in combination with a certain kind of tertiary saturated aliphatic di-tri- or tetra-amine; the pH of the bath is adjusted to about 4 to 5.5, and the bath containing the fibers is then heated; also the aforesaid after-treatment baths per se.

This application discloses and claims only subject matter disclosed in our pending application Ser. No. 637,309, filed May 9, 1967, *now U.S. Pat. No. 3,467,486,* as a continuation application of our application Ser. No. 515,774, filed Oct. 22, 1965 as a divisional application under Rule 147 of our application Ser. No. 296,392,, filed July 19, 1963, both last-mentioned applications being now abandoned.

Description of the invention

This invention relates to improvements in dyeing and printing on polyamide fibers as well as, industrial products, the dyed and printed polyamide fibers treated according to the invention.

Hitherto, wool and other polyamide fibers including nylon and the like synthetic polyamide fibers which had been dyed with reactive dyestuffs containing per molecule at least one substituent which can be split off as an anion during the dyeing and/or after-treatment of the dyed fibers, had to be subjected to an after-treatment in an aqueous basic medium of a pH of preferably about 7.5 or higher which contains, for example, sodium hydroxide, sodium carbonate, or preferably ammonia or hexamethylenetetraamine as the basic agent.

This known alkaline after-treatment, which serves to fix on the fibers still unreacted dyestuff present in the dyed goods, suffers from the drawback that the polyamide fibers can be injured by the alkaline medium and particularly by a subsequent drying step if the same is carried out directly on the after-treated fibers.

Therefore, in the known dyeing methods, the after-treatment with an alkaline medium is followed usually by a further treatment in an acid medium prior to final drying of the dyed or printed fibers.

Another drawback of the after-treatment with alkaline agents such as ammonia or hexamethylenetetramine resides in the tendency of the alkaline bath to remove at least part of the still unreacted dyestuff from the fibers, whereby an exact control of the shade of the fixed dyeings or prints is made very difficult.

It is, therefore, an object of the present invention to provide, in a process of dyeing or printing polyamide fibers with reactive dyestuffs of the type described, an after-treatment of the dyed fibers for the purpose of fixing still unreacted residual dyestuff on the fibers, which after-treatment does not injure the fibers, permits of drying the after-treated fibers directly without further intermediate treatments, and allows for a more exact control in producing a desired shade.

These objects are attained by the treatment according to the invention, which comprises, as an after-treatment in dyeing and printing processes for producing colored polyamide fibers by heating and thereby reacting said fibers with relative dyestuff, i.e. dyestuff containing at least one mobile substituent capable of being split off as anion, in an aqueous acid medium, preferably at a pH of about 4.5 to 5, and, preferably, with subsequent rinsing of the colored fibers in water of a temperature of about 10° to preferably 60°, and not more than 70° C., and drying, (I) introducing the freshly colored, and preferably immediately subsequently rinsed, fibers, directly thereafter and prior to drying, into an aqueous solution of a condensation product of (a) a naphthalene sulfonic acid, in particular a mono- to trisulfonic acid, and preferably naphthalene-2-monosulfonic acid, or a 1,2,3,4-tetrahydronaphthalene sulfonic acid, (b) from about 0.5 to 1.5, and preferably from 0.8 to 1.2 parts by weight, per part by weight of (a), of a compound of the formula HO-phenylene-$SO_2$-phenylene-OH preferably 4,4'-dihydroxy-diphenylsulfone, and (c) from about 0.1 to 0.2, and preferably 0.1 part by weight, per part by weight of (a), of formaldehyde, in aqueous, preferably about 30%-solution, (II) if necessary, adjusting the pH of the aqueous solution to about 4 to 5.5, and preferably to 4.5 to 5, by the addition of acid, such as acetic or formic acid, and preferably of acetic acid, and (III) heating the said aqueous solution and the colored fibers therein for a short time, about 10 to 60, and preferably 15 to 30 minutes, at a temperature of about 20° to 100°, and preferably 60° to 85° C.

According to another mode of carrying out the treatment according to the invention in practice, the condensation product used as the fixing agent in the aqueous acid solution of steps (I) to (III) described supra, is produced by condensation of (a) a α,ω-dichloro- or α,ω-dibromoalkane of from 2 to 7 carbon atoms, or ω,ω'-dichloro-dialkylether with a total of from 4 to 8 carbon atoms, with (b) a tertiary saturated aliphatic amine with a total of from 6 to 24 carbon atoms and from two to four amino nitrogen atoms, in such molar ratio of (a):(b) that approximately one halogen atom is present in the condensation reaction for every amino nitrogen atom.

According to yet another mode of carrying out the treatment according to the invention in practice, there is used in the aqueous solution of steps (i) to (III) supra, in lieu of the above-mentioned condensation products, a product produced by the condensation of (a) dicyanodiamide, (b) at least one mole, per mole of (a), or an excess thereover, of an ammonia donator which is either urea or an ammonium salt of a mineral acid capable of splitting off ammonia, and (c) at least two moles, per mole of (a), or an excess thereover, of formaldehyde in aqueous, preferably 30% by weight, solution. A concentration of about 0.5 gram of condensation product per liter of solution is the minimum.

In the second and third modes of the treatment according to the invention described above, the addition of acid to the solution in accordance with step II, supra, is mandatory.

As polyamide fibers, those of natural origin, above all wool and silk, but also synthetic polyamide fibers such as the various kinds of nylon e.g. nylon 6, nylon 66, and nylon 11 (Rilsan), are suitable for the after-treatment according to the invention.

These polyamide fibers are dyed by known methods in a dyestuff solution whcih, in addition to the dyestuffs mentioned, can also contain the auxiliaries usual in wool dyeing, e.g. salts such as sodium sulfate or ammonium sulfate and/or dilute acids, e.g. acetic or formic acid, and/or wetting agents, e.g. condensation products of fatty acids having at least 8 carbon atoms and lower alkanolamines such as are described in U.S. Patent 2,089,212.

The aforesaid fibers are printed by known processes in neutral or acid medium in the presence of thickeners and, optionally, urea.

The after-treatment according to the invention with the solution of the condensation products is preferably performed in a solution which contains these products in a concentration of about 0.5 to 3 g. per liter, furthermore, optionally, other additives usual in textile dyeing, and finally, acid, e.g. acetic or formic acid, as mentioned above.

The aforesaid condensation products suitable for use in the first above-described mode of carrying out the invention in practice are produced as described in German Patent 611,671, issued Apr. 5, 1935; those suitable for use in the second mode of practicing the invention described above, are produced as described in German Patent 894,237, issued Oct. 22, 1953. This class of condensation products is obtained by reacting the components mentioned above at a raised temperature, about 50 to 140° C., possibly in the presence of diluents, e.g. butyl alcohol, ethylene glycol or diethylene glycol. Among the saturated aliphatic tertiary polyamines defined above, there are:

Di-, tri- and tetra-amines such as N,N'-tetramethylhexamethylenediamine and homologues, N,N'N''-pentamethyl - diethylenetriamine, N,N',N'',N''' - hexamethyltriethylenetetramine as well as industrial mixtures thereof also.

Examples of $\alpha,\omega$-dihalogen alkanes are 1,2-dichloro- or 1,2-dibromo-ethane, 1,3-dichloro-propane, 1,4-dichlorobutane, 1,5-dichloropentane, 1,6-dichlorohexane; $\omega,\omega$-dihalogen ethers are, e.g. $\beta,\beta'$-dichlorodiethyl ether, ethylene glycol-di-$\beta$-chloroethyl ether, $\beta,\beta'$-di-(2-chloroethoxy)-di-ethyl ether, $\gamma,\gamma'$-dichloropropyl ether as well as glycerin dichlorohydrin. The reaction products are most effective when the ratio of the reaction components is so chosen that there is about one halogen atom per N atom, so that, for example, on using a triamine, two mols of amine are quaternized with three mols of $\alpha,\omega$-dihalogen alkane. Particularly good results are obtained with the condensation product of 2 mols of N,N',N''-pentamethyldiethylenetriamine and 3 mols of $\beta,\beta'$-dichlorodiethyl ether.

The condensation products usable in the third mode of carrying out the treatment according to the invention are produced from dicyanodiamide and the ammonium salt of a strong mineral acid or urea, and formaldehyde, as described in German Patent 929,642, issued Oct. 22, 1953. Best results are obtained with compounds from this class which are produced in accordance with Example 2 of German Patent 929,642.

The reactive dyestuffs used according to the invention can be of the most varied classes of dyestuffs. Preferably they are nitro, azo, anthraquinone or phthalocyanine dyestuffs, which classes excel in stability. They contain water-solubilizing, acid, salt-forming groups, mainly sulfonic acid groups, possibly also carboxyl groups or sulfamyl groups, in the latter case, among others, also acylated sulfamyl groups, e.g. disulfimide and carbonyl sulfimide groups.

The advantages attained according to the invention are particularly impressive when the reactive dyestuffs conventionally used for the fast dyeing of cellulose are used which contain sulfonic acid groups, e.g. 2 to 4, per dyestuff molecule. Thus, examples of dyestuffs, dyeings of which are especially suitable for use in the treatment according to the invention are nitrodiarylamine sulfonic acids, metal-free mono- and poly-azo dyestuffs, heavy metal-containing, e.g. chromium or cobalt-containing, o,o'-dihydroxy-, o-hydroxy-o'-carboxy- and o-hydroxy-o'-amino-mono-azo and dis-azo dyestuffs, copper-containing formazane dyestuffs, 1-amino-4-phenylamino anthraquinone dyestuffs, and copper phthalocyanines with substituted sulfamyl groups, all of which preferably contain at least two sulfonic acid groups.

Mobile substituents which can be split off as anion are mainly: radicals of strong acids, in particular halogen atoms, of these preferably chlorine, or bromine or fluorine, —the mobility of which is due, for example, to the bond at $\beta$-carbon atoms in negatively substituted organic radicals, at $SO_2$ groups in the case of fluorine, at carbon atoms adjacent to tertiary ring nitrogen in nitrogen heterocycles of aromatic character, in this case preferably 6-membered heterocycles having at least two tertiary ring nitrogen atoms—aromatically bound halogen atoms in o- and/or p-position to one (or more) electrophilic group(s), in particular fluorine or chlorine atoms; further, for example, the radical of sulfuric acid in sulfated $\beta$-hydroxyalkyl compounds, e.g. in sulfated $\beta$-hydroxy-alkyl sulfonyl and sulfamyl groups; or the radical of hydroxy-aryl compounds in O-aryl urethane groups.

Dyestuffs usable according to the invention contain the substituent which can be split off as anion, for example, in the form of $\beta$-chloro- or $\beta$-bromo-fatty acid amide groups, in which case $\beta$-chlorocrotonic acid amide or $\beta$-bromopropionic acid amide groups are preferred; or the said substituent is in the form of fluoro- or chloro-nitrobenzoylamino groups or fluoro- or chloro-nitrobenzene sulfonylamino groups in which the fluorine or chlorine atoms are in the o- and/or p-position to the nitro group or groups; or, preferably, it is in the form of chloro- or bromo-diazinylamino or triazinylamino groups, in which case it is in particular in the form of monochloro- or dichloro-s-triazinyolamino groups and, preferably, di- or trichloropyrimidiylamino groups. Dyestuffs with at least one di- or tri-halogen pyrimidylamino group and at least 2 sulfonic acid groups are preferred in the dyeing and printing processes comprising the after-treatment according to the invention.

An advantage of the treatment according to the invention over the known processes is the elimination of an alkaline after-treatment with, for example ammonia or hexamethylenetetramine. This advantage becomes most apparent in the dyeing and printing of wool which is sensitive to alkali, as the danger of injury to the fibers inherent in the alkaline after-treatment is avoided.

Moreover, the control of producing the desired shade more exactly is facilitated since changes in shade due to shifting of the pH of the dyeing medium from acid to alkaline and possibly back to acid are avoided.

Dyeings or prints on polyamide fibers attained according to the invention are distinguished by pure, strong and even shades and good fastness properties. In particular, they have remarkable wet fastness properties, for example fastness to water, washing, milling and perspiration, and particularly to sea-water.

The following non-limitative examples illustrate the invention. Where not otherwise stated, parts and percentages are given by weight. The relationship of parts by weight to parts by volume is as that of grams to cubic centimeters. The temperatures are given in degrees centigrade.

EXAMPLE 1

100 parts of wool are dyed in 4000 parts of a dye liquor which contains the following agents:

4 parts of a dyestuff of the formula

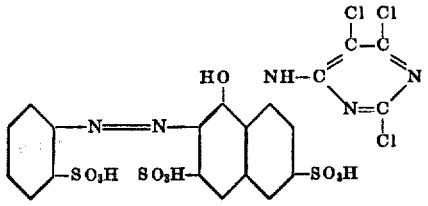

0.5 part of a condensation product of 1 mol of oleic acid and 2 mols of diethanolamine (Example 5 of U.S. Patent No. 2,089,212), and 4 parts of 80% acetic acid.

The goods are introduced into the liquor at 50°, dyeing is performed for 10 minutes at this temperature, the bath is brought to the boil within 30 minutes and dyeing is continued at the boil for 45 minutes.

After dyeing, the goods are well rinsed and treated in a fresh bath for 20 minutes at 60–80° which contains 0.75 g. per liter of a condensation product of formaldehyde with dihydroxydiphenyl sulfone and naphthalene sulfonic acids, the production of which condensation product is described below, as well as 0.25 g. per liter of 80% acetic acid.

Valuable red dyeings are obtained in this way which are very wet fast.

The condensation product mentioned is obtained as follows:

100 parts of the sulfonating mixture, obtained by heating for several hours at 140–160°, 520 parts of naphthalene and 560 parts of concentrated sulfuric acid until water solubility is attained, are heated for about 1 hour at 105–110° with 100 parts of a dihydroxydiphenyl sulfone, 50 parts of water and 45 parts of formaldehyde (30%). The dihydroxydiphenyl sulfone is obtained by heating 540 parts of phenol and 180 parts of 60% oleum for 3 hours at 170–180° and distilling off excess phenol.

By using, instead of the dyestuff given in Example 1, the dyestuffs listed in column 2 of the following table, and otherwise following the procedure described in said example, wool dyeings of the shade given in column 3 and of good fastness to washing, perspiration and sea water are obtained.

TABLE I

| No. | Dyestuff | Shade on wool |
|---|---|---|
| 1 | 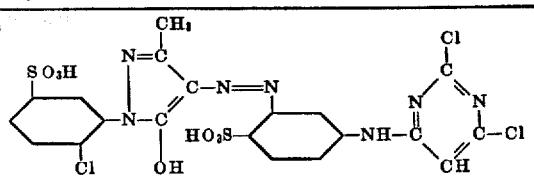 | Greenish-yellow. |
| 2 | 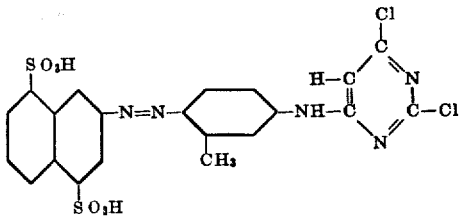 | Reddish-yellow. |
| 3 | 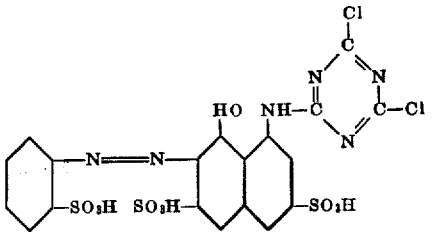 | Red. |
| 4 | 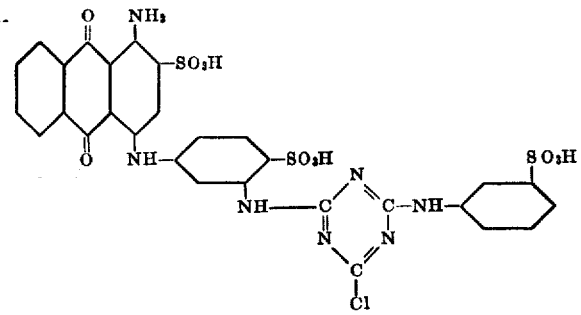 | Blue. |

TABLE I—Continued
| No. | Dyestuff | Shade on wool |
|---|---|---|
| 5 | 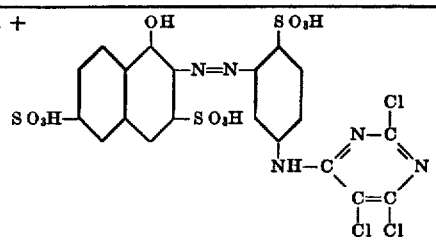 | Scarlet. |
| 6 | 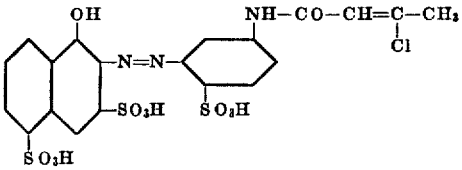 | Orange. |
| 7 | 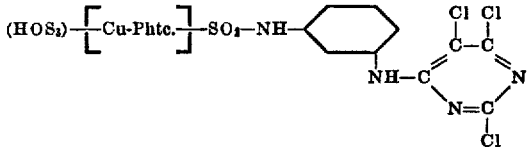 (wherein Cu-Phtc. is the copper phthalocyanine radical) | Turquoise blue. |
| 8 | 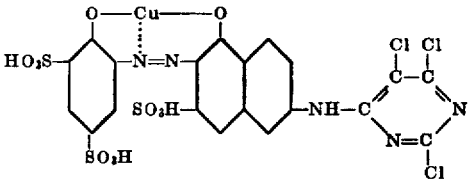 | Bordeaux. |
| 9 | 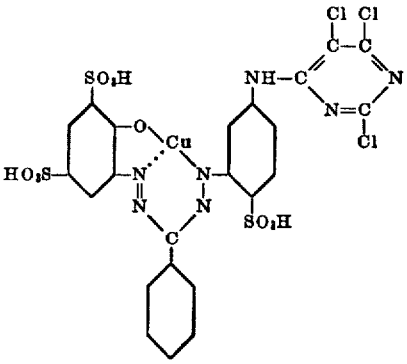 | Blue. |
| 10 | 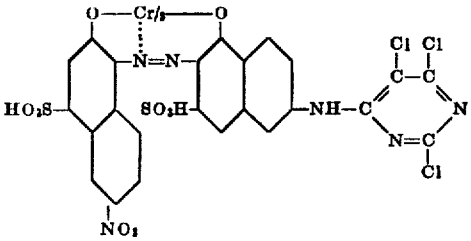 | Black. |
| 11 | 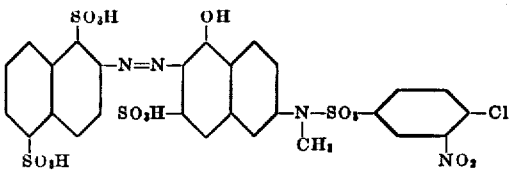 | Orange. |

TABLE I—Continued

| No. | Dyestuff | Shade on wool |
|---|---|---|
| 2 | 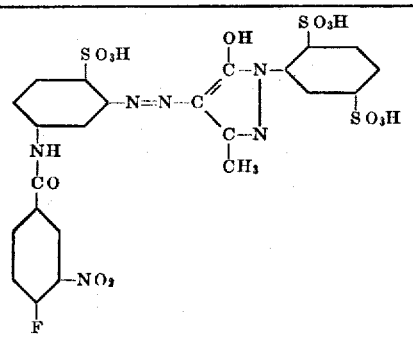 | Greenish yellow. |
| 13 | 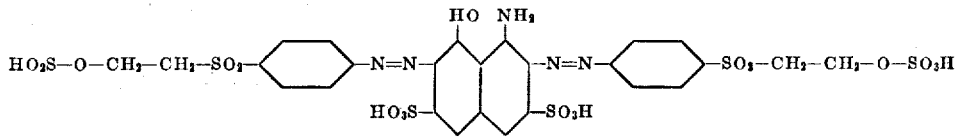 | Blue-black. |
| 14 | 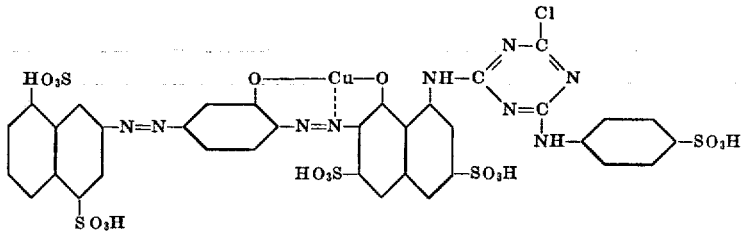 | Blue. |

EXAMPLE 2

Wool is printed with a printing paste of the following composition:

30 parts of the dyestuff of the formula

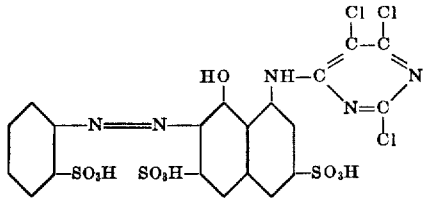

100 parts of urea,
10 parts of the sodium salt of m-nitrobenzene sulfonic acid,
450 parts of 5% sodium alignated solution, and
410 parts of water.

The goods are then dried, steamed and well rinsed with cold water.

The rinsed wool is then treated for 20 minutes at 60°–80° in a fresh bath which contains 0.75 g. per liter of the formaldehyde/dihydroxydiphenylsulfone/naphthalene sulfonic acids condensation product used in Example 1, supra, as well as 0.5 g. per liter of aqueous 80% acetic acid.

In this way, valuable red prints are obtained which have very good wet fastness properties.

EXAMPLE 3

100 parts of nylon are dyed in 4000 parts of a dye liquor which contains 1.5 parts of a dyestuff of the formula

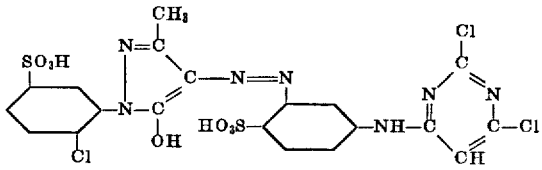

and 1 part of 80% acetic acid.

The goods are entered into the liquor at 40°, dyeing is performed for 10 minutes at this temperature, the bath is brought to the boil within 30 minutes and dyeing is continued for 45 minutes at the boil.

After dyeing, the goods are well rinsed and treated for 20 minutes at 60–80° in fresh bath which contains 0.75 g. per liter of the formaldehyde/dihydroxydiphenylsulfone/naphthalene sulfonic acids condensation product mentioned in column 5, lines 16–32 of Example 1 and 0.25 g. per liter of 80% acetic acid.

In this way, valuable greenish yellow dyeings which have very good wet fastness properties are obtained.

EXAMPLE 4

Nylon is printed with a printing paste of the following composition:

30 parts of the dyestuff of the formula

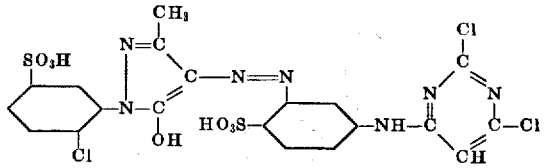

50 parts of urea,
250 parts of boiling water,
45 parts of phenol,
30 parts of thiodiethylene glycol,
450 parts of 5% sodium alginate solution, and
145 parts of water.

The goods are then dried and steamed and rinsed, first with cold and then with 60° warm water.

The rinsed goods are after-treated in a fresh bath in the manner described in the previous Example 3.

In this way, valuable greenish yellow prints are obtained, which have very good wet fastness properties.

EXAMPLE 5

100 parts of wool are dyed in 4000 parts of a dye liquor which contains the following agents:

4 parts of a dyestuff of the formula

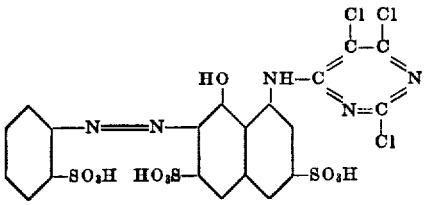

0.5 part of a condensation product of 1 mol of oleic acid and 2 mols of diethanolamine (Example 5 of U.S. Patent No. 2,089,212) and 4 parts of 80% acetic acid.

These goods are introduced at 85°, dyeing is performed for 10 minutes at this temperature, the bath is brought to the boil within 10 minutes and dyeing is performed at the boil for 45 minutes.

After dyeing, the dyed goods are rinsed and treated for 20 minutes at 60–80° in a fresh bath which contains 0.75 g. per liter of the reaction product of 2 mols of N,N′,N″-pentamethyl-diethylenetriamine with 3 mols of β,β′-dichlorodiethyl ether, and 0.25 g. per liter of 80% acetic acid. In this way, valuable vivid bluish red dyeings are obtained which are very wet fast.

Dyeings having similar good properties are obtained if, in the above example, instead of the reaction product mentioned, a nitrogen-containing condensation product of 34 parts of dicyanodiamide with 5.5 parts of ammonium chloride, 18 parts of urea and 80 parts formaldehyde is used in the after-treatment liquor and otherwise the same procedure is followed.

If, instead of the dyestuff mentioned in the example, those given in column 2 of Table II are used and otherwise the procedure described in the example is followed, then corresponding wool dyeings as given in column 3 are obtained.

TABLE II

| No. | Dyestuff | Shade on wool |
|---|---|---|
| 1 | 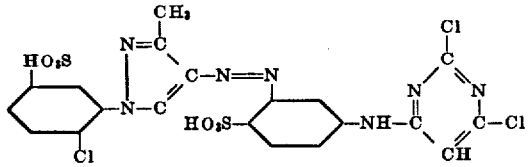 | Greenish yellow. |
| 2 | 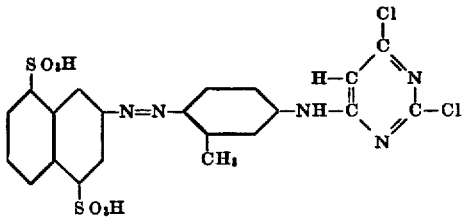 | Reddish yellow. |
| 3 | 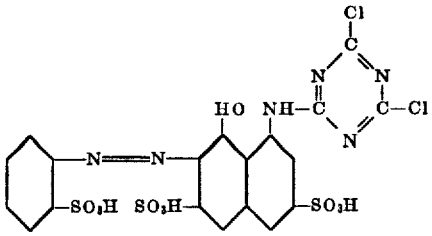 | Red. |
| 4 | 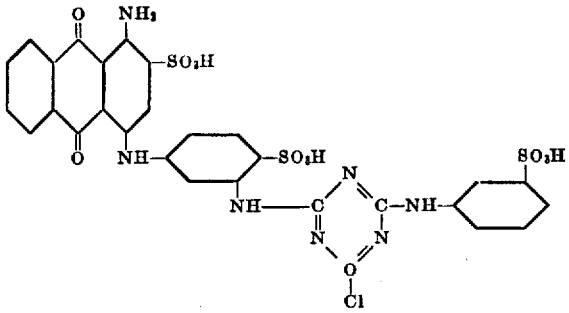 | Blue. |
| 5 | 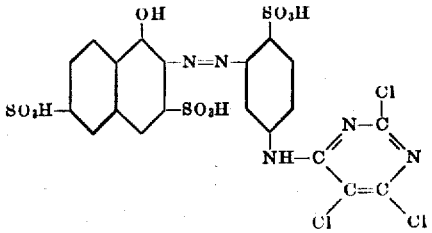 | Scarlet. |

TABLE II—Continued
| No. | Dyestuff | Shade on wool |
|---|---|---|
| 6 | 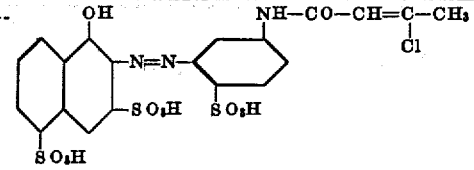 | Orange. |
| 7 | 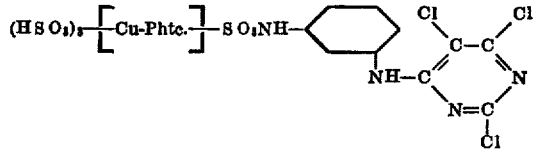 (wherein CuPhtc. is the copper phthalocyanine radical) | Turquoise blue. |
| 8 | 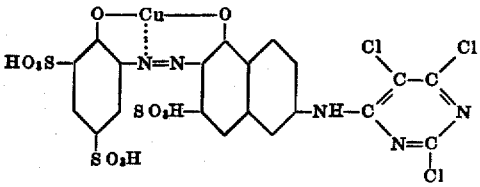 | Bordeaux. |
| 9 | 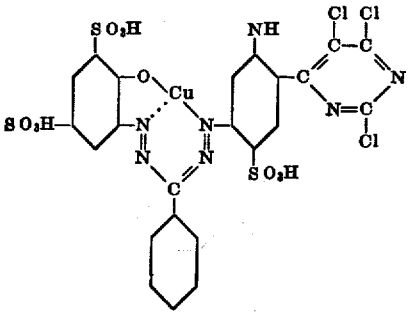 | |
| 10 | 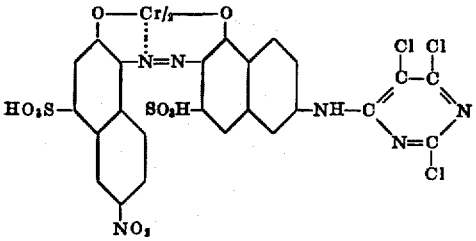 | Black. |
| 11 | 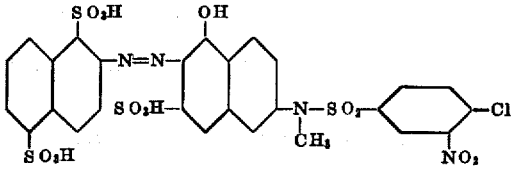 | Orange. |
| 12 | 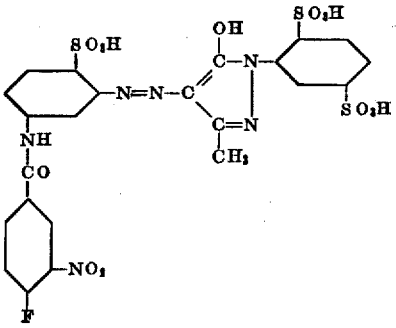 | Greenish-yellow. |

TABLE II—Continued

| No. | Dyestuff | Shade on wool |
|---|---|---|
| 13 | 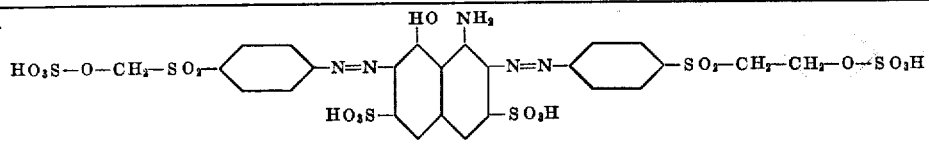 | Blue-black. |
| 14 | 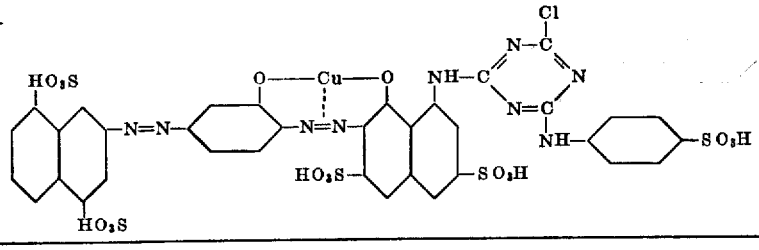 | Blue. |

EXAMPLE 6

Wool is printed with a printing paste of the following composition:

30 parts of the dyestuff of the formula

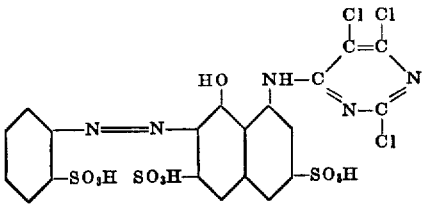

100 parts of urea,
10 parts of the sodium salt of m-nitrobenzene sulfonic acid,
450 parts of 5% sodium alginate solution, and
410 parts of water.

The goods are then dried, steamed and well rinsed with cold water.

The rinsed wool is after-treated as described in Example 1. In this way, valuable, vivid bluish red prints are obtained which have very good wet fastness properties.

Similar results are obtained if, instead of the reaction products as described in Example 1, a nitrogen-containing condensation product of 34 parts of dicyano-diamide with 12 parts of ammonium chloride, 12 parts of urea and 80 parts of formaldehyde are used.

EXAMPLE 7

100 parts of nylon are dyed in 4000 parts of a dye liquor which contains 1.5 parts of a dyestuff of the formula

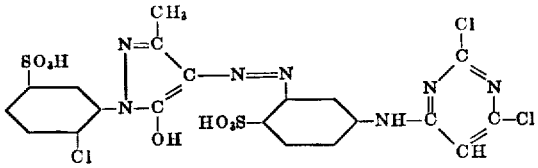

and 1 part of 80% acetic acid.

The goods are introduced at 40°, dyeing is performed for 10 minutes at this temperature, the bath is brought to the boil within 30 minutes and dyeing is continued for 45 minutes at boiling temperature.

After dyeing, the goods are well rinsed and then treated in a fresh bath for 20 minutes at 60–80° which contains 0.75 g. per liter of the reaction product of 2 mols of N,N',N''-pentamethyl diethylene-triamine and 3 mols of β,β'-dichlorodiethyl ether, and also 0.5 g. per liter of 40% acetic acid. In this way, valuable greenish yellow dyeings which have very good wet fastness properties are obtained.

Similarly good dyeings are obtained if, in the above example, nitrogen-containing condensation product of 34 parts of dicyanodiamide with 11 parts of ammonium chloride, 12 parts of urea and 80 parts of formaldehyde is used in the after-treatment bath instead of the reaction product mentioned and otherwise the same procedure is followed.

EXAMPLE 8

Nylon is printed with a printing paste of the following composition:

30 parts of the dyestuff of the formula

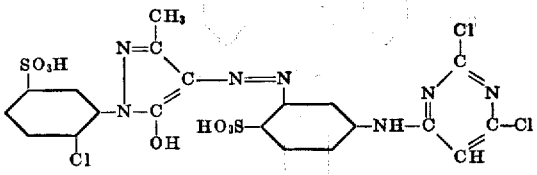

50 parts of urea,
250 parts of boiling water,
45 parts of phenol,
30 parts of thiodiethylene glycol,
450 parts of 5% sodium alginate solution and
145 parts of water The goods are then dried, steamed and rinsed first with cold and then with 60° warm water.

The rinsed goods are after-treated as described in Example 3. In this way, valuable greenish yellow prints which have very good wet fastness properties are obtained.

Similar results are further obtained if, instead of the reaction product as described in Example 3, a reaction product obtained from corresponding amounts of N,N'-tetramethyl - ethylene - diamine and γ,γ'-dichloropropyl-ether or 1,4-dibromobutane or corresponding amounts of N,N'-tetramethyl - tetramethylene - diamine and glycldichlorohydrin is used.

We claim:

1. In a process for producing colored polyamide fibers, the improvement comprising (I) introduching polyamide fibers freshly colored by heating and thereby reacting said fibers in an aqueous acid medium with reactive dyestuff which contains at least one mobile substituent capable of being split off as anion, after coloration and prior to drying, into an aqueous solution the solute of which consists essentially of the condensation product of (a) a member selected from the group consisting of dichloroalkane of from 2 to 7 carbon atoms, dibromo-alkane of from 2 to 7 carbon atoms, and dichloro-dialkylether with a total of from 4 to 8 carbon atoms, with (b) a tertiary saturated aliphatic amine with a total of from 6 to 24 carbon atoms and from 2 to 4 amino nitrogen atoms, in such molar ratio of (a):(b) that approximately one halogen atom is present in the condensation reaction for every amino nitrogen atom;

(II) adjusting the pH of the aqueous solution to about 4 to 5.5, by the addition of acid, and (III) heating the resulting acidified aqueous solution and the colored fibers therein for about 10 to 60 minutes, at a temperature of from about 20° to 100° C.

2. The improvement described in claim 1, wherein the condensation product is that of 2 moles of N,N',N''-pentamethyl-diethylenetriamine and 3 moles of $\beta,\beta'$-dichlorodiethylether.

3. The improvement described in claim 1, wherein the tertiary saturated aliphatic amine is a member selected from the group consisting of N,N'-tetra-lower alkyl-hexamethylene diamine, N,N',N'' - penta - lower alkyldiethylene triamine, and N,N',N'',N'''-hexa-lower alkyltriethylene-tetramine.

4. The improvement described in claim 1, wherein the acid added in step (II) is a member selected from the group consisting of acetic acid and formic acid.

5. The improvement described in claim 1, wherein, in step (II), the pH is adjusted to about 4.5 to 5.

6. The improvement described in claim 1, wherein the aqueous acid solution and fibers therein are heated in step (III) at a temperature of about 60° to 85° C.

7. The improvement described in claim 1, wherein said reactive dyestuff contains a halogen-substituted pyrimidylamino reactive dyestuff radical and from 2 to 3 sulfonic acid groups.

8. The improvement described in claim 1, wherein said polyamide fibers are wool.

9. The improvement described in claim 1 wherein the concentration of said solute in said aqueous solution is about 0.5 to 3 g. per liter.

10. The improvement described in claim 1 wherein said dyestuff is selected from the group consisting of nitro, azo, anthroquinone phthalocyanine dyestuffs.

References Cited

The following references, cited by the Examiner, are of record in the patented file of this patent or the original patent.

UNITED STATES PATENTS

| | | | |
|---|---|---|---|
| 3,104,933 | 9/1963 | Mendelsohn et al. | 8—85 |
| 3,198,595 | 8/1965 | Mawson et al. | 8—18 |

FOREIGN PATENTS

| | | | |
|---|---|---|---|
| 1,277,635 | 10/1961 | France | 8—1 S |
| 894,237 | 10/1953 | Germany | 8—74 |

OTHER REFERENCES

L. Diserens: The Chemical Technology of Dyeing and Printing, vol. 2, 1951, pp. 318, 319 and 336.

GEORGE F. LESMES, Primary Examiner

T. J. HERBERT, Jr., Assistant Examiner

U.S. Cl. X.R.

8—74, 172; 260—2